(12) United States Patent
Cho

(10) Patent No.: US 12,435,549 B2
(45) Date of Patent: Oct. 7, 2025

(54) OPENING AND CLOSING APPARATUS FOR GLOVE BOX AND GLOVE BOX ASSEMBLY INCLUDING THE SAME

(71) Applicant: HYUNDAI MOBIS CO., LTD., Seoul (KR)

(72) Inventor: Young Min Cho, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 48 days.

(21) Appl. No.: 18/584,295

(22) Filed: Feb. 22, 2024

(65) Prior Publication Data

US 2025/0027348 A1    Jan. 23, 2025

(30) Foreign Application Priority Data

Jul. 19, 2023    (KR) ..................... 10-2023-0093668

(51) Int. Cl.
| E05B 83/30 | (2014.01) |
| B60R 7/06 | (2006.01) |
| E05B 85/10 | (2014.01) |

(52) U.S. Cl.
CPC ............... *E05B 83/30* (2013.01); *B60R 7/06* (2013.01); *E05B 85/103* (2013.01)

(58) Field of Classification Search
CPC ......... E05B 83/28; E05B 83/30; E05B 83/32; E05B 83/36; E05B 85/103; B60R 7/06
See application file for complete search history.

(56) References Cited

U.S. PATENT DOCUMENTS

| 10,435,921 | B2 * | 10/2019 | Nakasone | ............... E05C 9/043 |
| 11,098,503 | B2 * | 8/2021 | Nakasone | ............... E05B 79/06 |
| 11,377,884 | B2 * | 7/2022 | Nakasone | ................ E05C 9/04 |
| 11,913,263 | B2 * | 2/2024 | Nakasone | ............... E05C 9/043 |
| 11,959,313 | B2 * | 4/2024 | Wieczorek | ............... E05B 83/30 |
| 12,044,049 | B2 * | 7/2024 | Nakasone | ............... E05B 79/06 |
| 12,241,289 | B2 * | 3/2025 | Woo | ....................... E05B 77/06 |
| 2024/0067097 | A1 * | 2/2024 | Shin | ......................... B60R 7/06 |

* cited by examiner

Primary Examiner — Kristina R Fulton
Assistant Examiner — Noah Horowitz
(74) Attorney, Agent, or Firm — NSIP Law

(57) ABSTRACT

An opening and closing apparatus including a knob unit disposed on a glove box provided in a cockpit module, the knob unit being configured to be exposed when the glove box is in an open state and not exposed when the glove box is in a closed state, a rod unit coupled to the cockpit module through the glove box, the rod unit being configured to fix or release the glove box to or from the cockpit module in conjunction with a movement of the knob unit, and a rotator including a first contact portion and a second contact portion disposed in different directions to connect the knob unit and the rod unit, the rotator being configured to move the rod unit by receiving a rotational force generated through the knob unit.

11 Claims, 9 Drawing Sheets

OPENING AND CLOSING APPARATUS FOR GLOVE BOX AND GLOVE BOX ASSEMBLY INCLUDING THE SAME

CROSS-REFERENCE TO RELATED APPLICATION

This application claims the benefit under 35 USC § 119 (a) of Korean Patent Application No. 10-2023-0093668, filed on Jul. 19, 2023, the entire disclosure of which is incorporated herein by reference for all purposes.

BACKGROUND

1. Field of the Invention

The present invention relates to an opening and closing apparatus for a glove box and a glove box assembly including the same.

2. Discussion of Related Art

In general, a glove box assembly is disposed in an interior of a vehicle to receive simple items. The glove box assembly is disposed on a side facing a passenger seat, which is a seat next to a driver's seat, in a cockpit module.

The glove box assembly includes a glove box having a shape that is hollow inside for receiving objects, and an opening and closing apparatus that is attached to the glove box to open or close an interior space of the glove box. The opening and closing apparatus may include a push type and a pull type.

Among those, the pull type opening and closing apparatus may include a knob unit configured to be pulled by a user. However, a conventional glove box assembly is equipped with many components to rotate the glove box by operating the knob unit. Therefore, the knob unit needs to be pulled using more operating force than necessary. Accordingly, since the glove box rotates at a high speed due to the knob unit operated by a passenger's excessive force, there is a problem in that the glove box collides with the passenger's hand, causing injury.

SUMMARY OF THE INVENTION

In a general aspect, an opening and closing apparatus opening and closing apparatus for a glove box includes a knob unit disposed on a glove box provided in a cockpit module, the knob unit being configured to be exposed when the glove box is in an open state and not exposed when the glove box is in a closed state, a rod unit coupled to the cockpit module through the glove box, the rod unit being configured to fix or release the glove box to or from the cockpit module in conjunction with a movement of the knob unit, and a rotator including a first contact portion and a second contact portion disposed in different directions to connect the knob unit and the rod unit, the rotator being configured to move the rod unit by receiving a rotational force generated through the knob unit.

The first contact portion and the second contact portion may be configured to be rotated in a same direction with respect to one center.

The rotator may include a rotating portion configured to supports the first contact portion and the second contact portion and that the first contact portion may be disposed above the second contact portion along an axial direction of the rotating portion.

The knob unit may include a knob main body including a concave-convex portion, a pressing portion disposed on the knob main body and in contact with the first contact portion, and a first pin configured to connect a box main body of the glove box to the knob main body, and the rotator may include a second pin coupled to the rotating portion, the second pin being configured to provide a center of rotation about the first contact portion, the second contact portion, and the rotating portion, and the second pin may be disposed closer to the first pin than the concave-convex portion of the knob main body.

The knob main body and the pressing portion may be integrally formed.

The glove box may be rotatably disposed in a cockpit module to open and close the glove box.

In a general aspect, here is provided a glove box assembly including a glove box rotatably disposed in a cockpit module and an opening and closing apparatus for the glove box coupled to the glove box and configured to open and close the glove box, and the opening and closing apparatus for the glove box may include a knob unit disposed on the glove box, the knob unit being configured to be exposed when the glove box is in an open state and not exposed when the glove box is in a closed state, a rod unit coupled to the cockpit module through the glove box, the rod unit being configured to fix or release the glove box to or from the cockpit module in conjunction with movement of the knob unit, and a rotator including a first contact portion and a second contact portion disposed in different directions to connect the knob unit and the rod unit, the rotator being configured to move the rod unit by receiving a rotational force generated through the knob unit.

The first contact portion and the second contact portion of the rotator may be configured to be rotated in a same direction with respect to one center.

The rotator may be a rotating portion configured to support the first contact portion and the second contact portion and the first contact portion may be disposed above the second contact portion along an axial direction of the rotating portion.

The knob unit may include a knob main body including a concave-convex portion, a pressing portion disposed on the knob main body and in contact with the first contact portion, and a first pin configured to connect a box main body of the glove box to the knob main body, the rotator may include a second pin coupled to the rotating portion, the second pin being configured to provide a center of rotation about the first contact portion, the second contact portion, and the rotating portion, and the second pin is disposed closer to the first pin than the concave-convex portion of the knob main body.

The opening and closing apparatus may include a holding bracket which may include a first holding portion configured to rotatably receive the first pin and a second holding portion including leg frames configured to rotatably receive the second pin, the knob main body of the knob unit may be spaced apart from the rotator with the second holding portion of the holding bracket interposed therebetween, and the pressing portion of the knob unit may be configured to be in contact with the rotator in a space between the leg frames.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
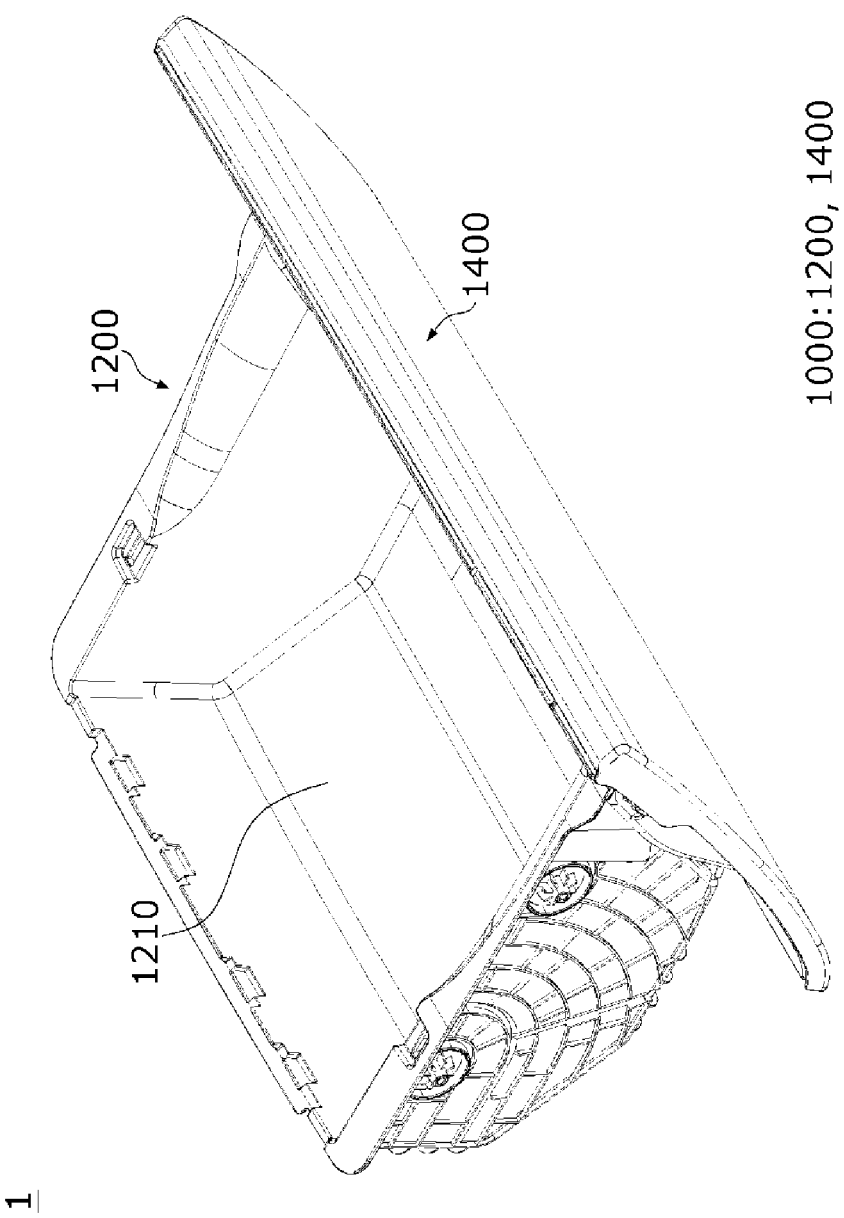
FIG. 1 is a front perspective view of a glove box assembly according to one embodiment of the present invention.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The present invention is directed to providing an opening and closing apparatus for a glove box which is improved to easily open the glove box with less force, and a glove box assembly including the same.

Figure 2:
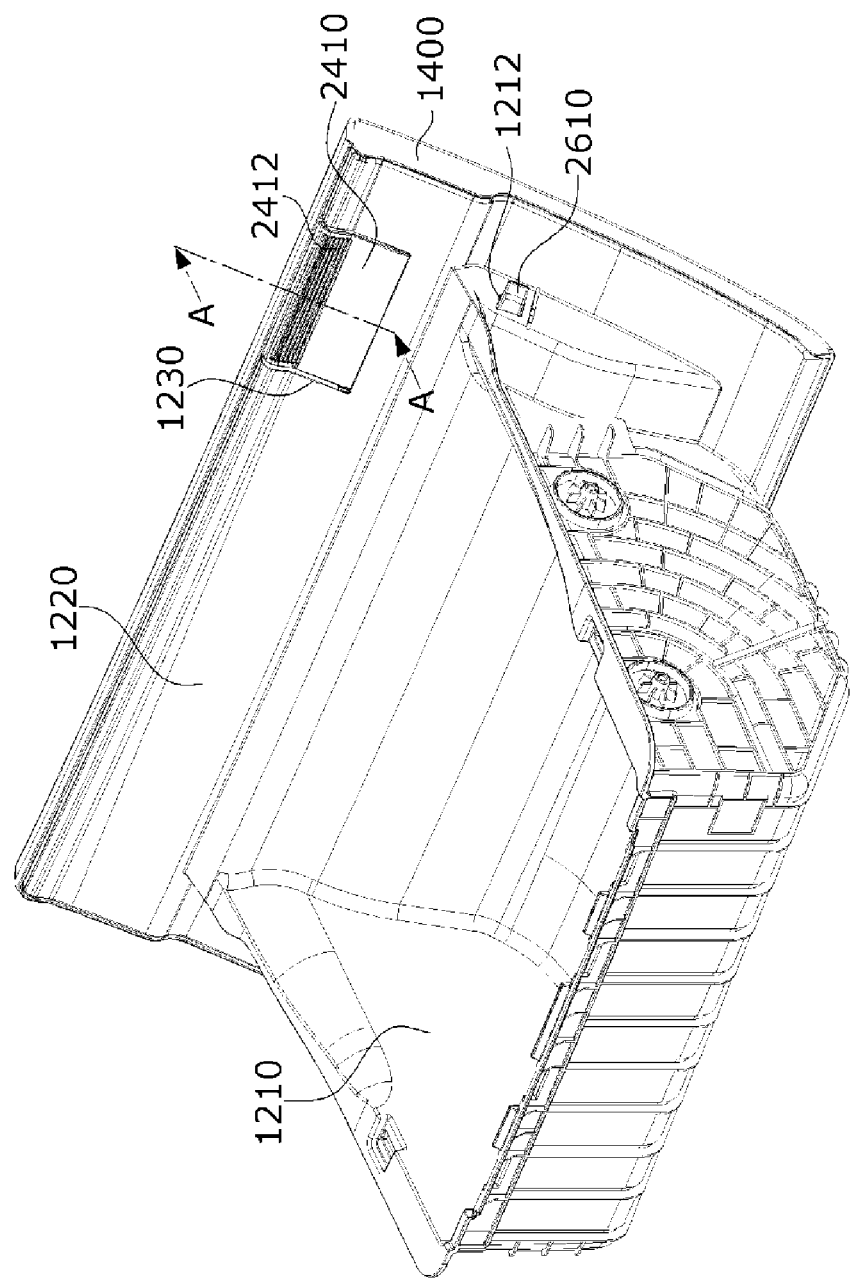
FIG. 2 is a rear perspective view of the glove box assembly according to one embodiment of the present invention.
Figure 3:
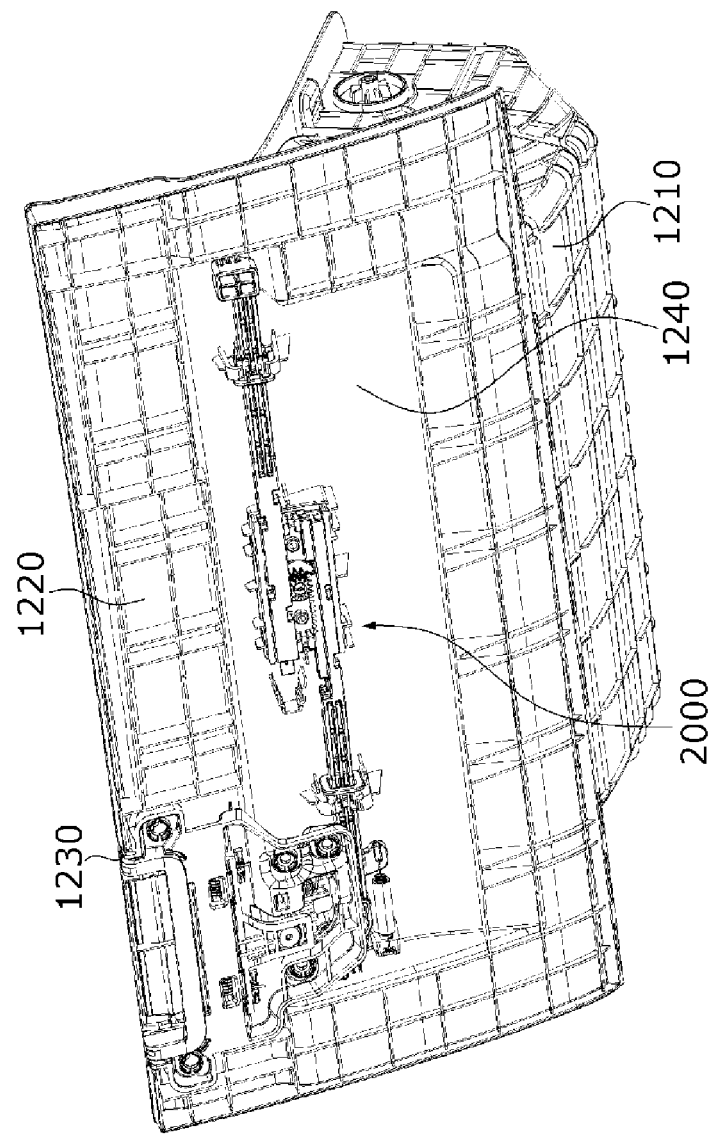
FIG. 3 is a perspective view of the glove box assembly with a cover panel removed.

FIG. 1 is a front perspective view of a glove box assembly according to one embodiment of the present invention, FIG. 2 is a rear perspective view of the glove box assembly according to one embodiment of the present invention, and FIG. 3 is a perspective view of the glove box assembly with a cover panel removed.

With reference to FIGS. 1 to 3, a glove box assembly 1 according to one embodiment of the present invention includes a glove box 1000 and an opening and closing apparatus for a glove box 2000 (hereinafter referred to as an "opening and closing apparatus 2000").

The glove box 1000 may be rotatably disposed in a cockpit module (not illustrated). The glove box 1000 may include a box main body 1200 and a cover panel 1400. The box main body 1200 may include a storage block 1210, a rim panel 1220, a first receiving portion 1230, and a second receiving portion 1240.

The storage block 1210 may be rotatably coupled to the cockpit module. The storage block 1210 is a component that forms a space in which objects can be seated and stored, and the storage block 1210 may have a shape that is open on one side thereof.

The storage block 1210 may include support holes 1212. The support holes 1212 may be disposed on both side portions of the storage block 1210. The support holes 1212 may movably support an end portion of a first rod 2610 and an end portion of a second rod 2620, which will be described below. The end portion of the first rod 2610 and the end portion of the second rod 2620 may pass through the support hole 1212, and protrude to the outside of the storage block 1210 and then be coupled to the cockpit module.

The rim panel 1220 may be disposed in one area of the storage block 1210. The rim panel 1220 may have a shape that encloses a rim of the one area of the storage block 1210. The rim panel 1220 may have a length that is greater than a length of the storage block 1210 along a lengthwise direction. Here, the lengthwise direction means a direction in which a surface having a greater length is disposed among two surfaces forming edges of the rim panel 1220. An edge shape of the rim panel 1220 may be a shape that corresponds to a shape of an inner surface of the cover panel 1400.

The first receiving portion 1230 may be formed in the rim panel 1220. More specifically, the first receiving portion 1230 may be formed at an upper end of the rim panel 1220. The first receiving portion 1230 may have a groove shape that is recessed inward from the edge of the rim panel 1220. The first receiving portion 1230 may receive a knob main body 2410, which will be described below, of the opening and closing apparatus 2000, and a first holding portion 2210 of a holding bracket 2200.

The second receiving portion 1240 may be disposed in one area (a center portion) of the rim panel 1220. The second receiving portion 1240 may be formed in an area of the storage block 1210 that is coupled to the rim panel 1220. More specifically, the second receiving portion 1240 may be formed by a shape of one area of the storage block 1210 that is concavely formed toward an interior of the storage block 1210. The second receiving portion 1240 may be connected to the first receiving portion 1230. The second receiving portion 1240 may receive a plurality of components of the opening and closing apparatus 2000. The components of the opening and closing apparatus 2000 received in the first receiving portion 1230 and the second receiving portion 1240 do not protrude to the outside of the rim panel 1220.

The cover panel 1400 may be coupled to the rim panel 1220. The cover panel 1400 may cover the rim panel 1220. When the cover panel 1400 covers the rim panel 1220, a portion of the opening and closing apparatus 2000 received in the first receiving portion 1230 and the second receiving portion 1240 may not be exposed. More specifically, in a state where the storage block 1210 is closed so as not to be exposed to the outside of the cockpit module, the opening and closing apparatus 2000 is not exposed by the cover panel 1400, but in a state where the storage block 1210 is rotated so as to be exposed to the outside of the cockpit module, the knob main body 2410, which will be described below, of the opening and closing apparatus 2000 may be exposed to be visible to a passenger seated in a passenger compartment.

As such, the cover panel 1400 may expose or not expose the opening and closing apparatus 2000 depending on an operation of the passenger. Therefore, the cover panel 1400 may be considered a configuration that enhances the design of a vehicle.

Figure 4:
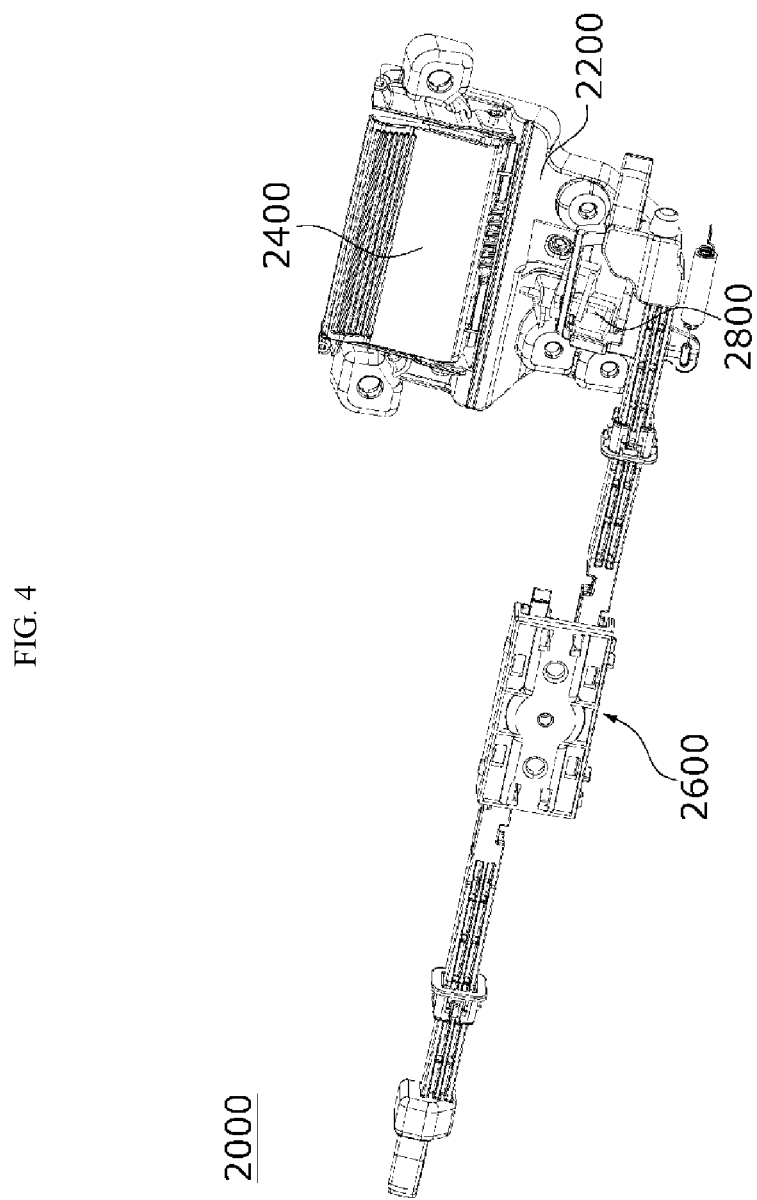
FIG. 4 is a perspective view illustrating an opening and closing apparatus.
Figure 5:
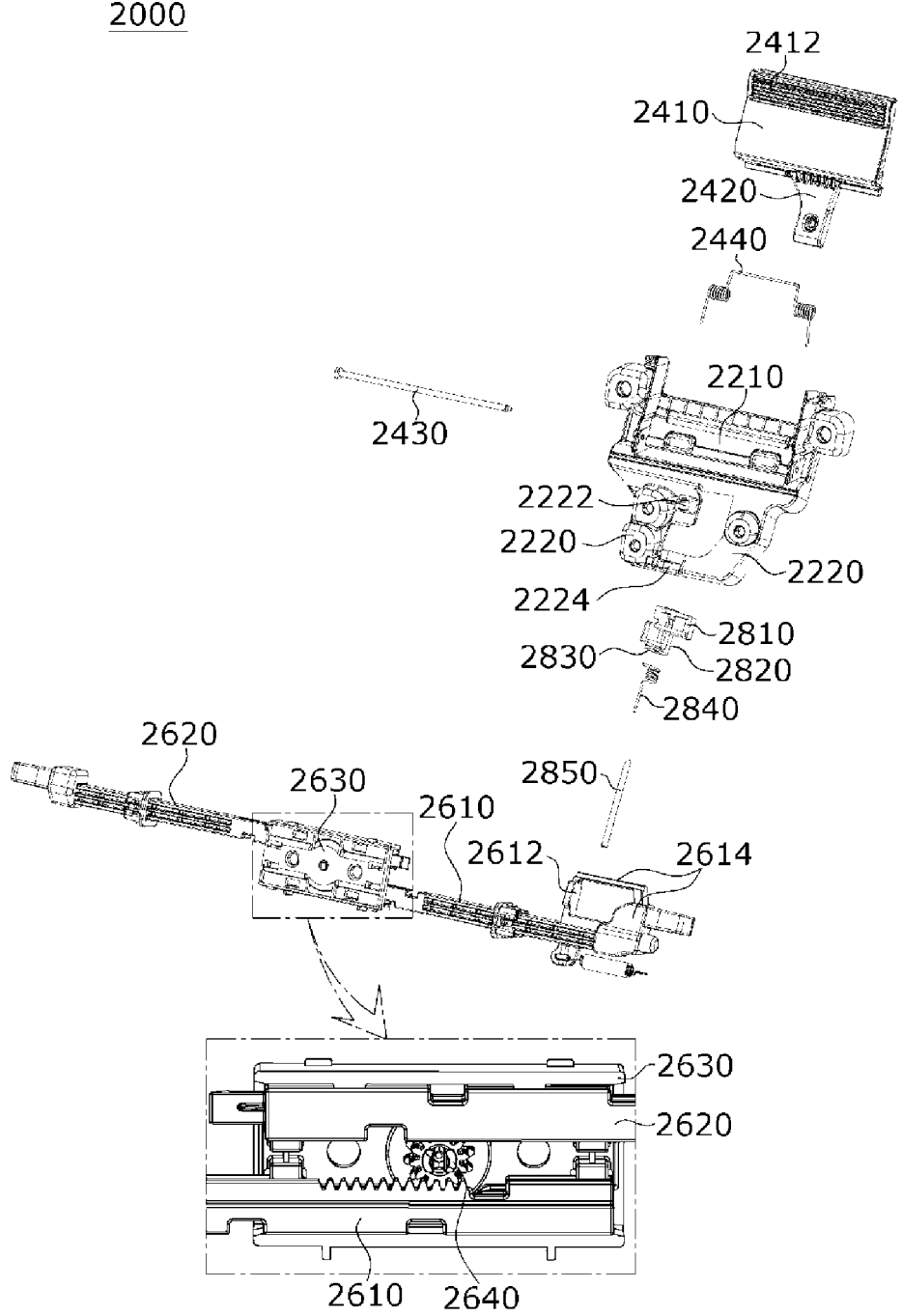
FIG. 5 is an exploded perspective view of the opening and closing apparatus.

FIG. 4 is a perspective view illustrating an opening and closing apparatus, and FIG. 5 is an exploded perspective view of the opening and closing apparatus.

Figure 6:
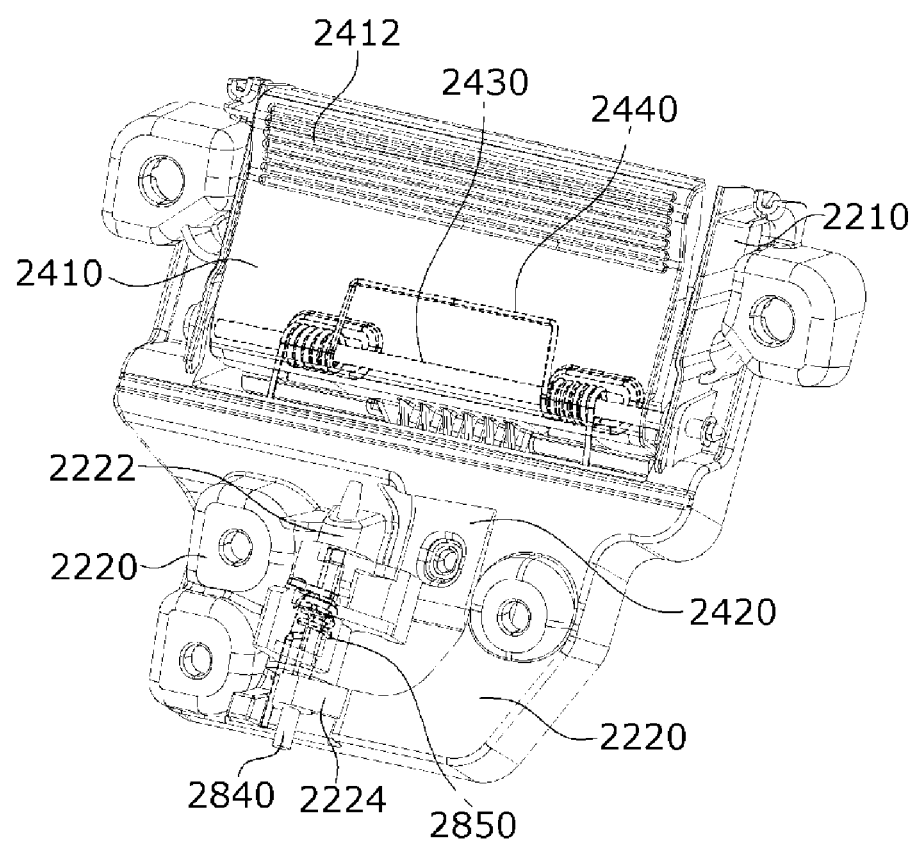
FIG. 6 is a view illustrating a state of a knob unit and a rotator coupled to a holding bracket.
Figure 7:
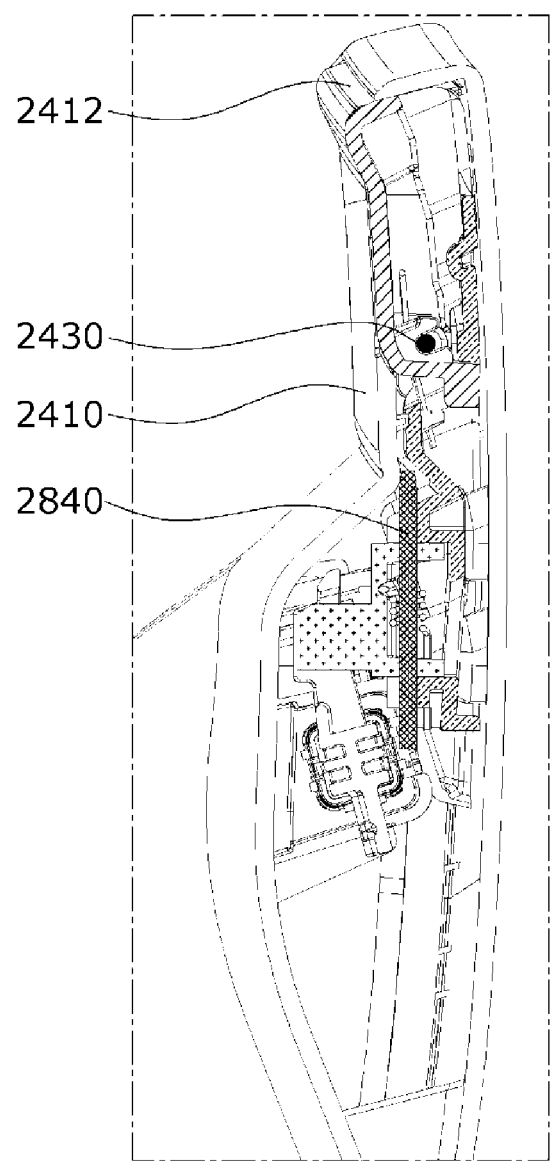
FIG. 7 is a cross-sectional view taken along line A-A in FIG. 2.

FIG. 6 is a view illustrating a state of a knob unit and a rotator coupled to a holding bracket, and FIG. 7 is a cross-sectional view taken along line A-A in FIG. 2.

With reference to FIGS. 1 to 7, the opening and closing apparatus for a glove box 2000 (hereinafter referred to as an "opening and closing apparatus 2000") is coupled to the glove box 1000 and is capable of opening and closing the glove box 1000. The opening and closing apparatus 2000 may include the holding bracket 2200, a knob unit 2400, a rod unit 2600, and a rotator 2800.

The holding bracket 2200 may hold the knob unit 2400 and the rotator 2800. The holding bracket 2200 may include the first holding portion 2210 and a plurality of second holding portions 2220.

The first holding portion 2210 may be disposed in the first receiving portion 1230 of the glove box 1000. The first holding portion 2210 may receive the knob main body 2410, a first pin 2430, and a first elastic member 2440 of the knob unit 2400, which will be described below. In particular, the first holding portion 2210 may rotatably support the first pin 2430. The first holding portion 2210 has a "C" shape, so that the first holding portion 2210 may be disposed to be spaced apart from the knob main body 2410, and a space may be provided for the knob main body 2410 to be rotated.

The plurality of second holding portions 2220 may be disposed across the first receiving portion 1230 and the second receiving portion 1240 of the glove box 1000. The plurality of second holding portions 2220 may be configured as a plurality of leg frames spaced apart from each other. The plurality of second holding portions 2220 may include a first protrusion 2222 and a second protrusion 2224.

The first protrusion 2222 and the second protrusion 2224 may be disposed on one of the plurality of leg frames. The first protrusion 2222 and the second protrusion 2224 may be disposed to be spaced apart from each other along a height direction. Here, the height direction may be a direction that intersects the lengthwise direction. The first protrusion 2222 and the second protrusion 2224 may be disposed in an area of the second holding portion 2220 that faces the rod unit 2600. Therefore, the first protrusion 2222 and the second protrusion 2224 may protrude from one of the plurality of leg frames toward the rod unit 2600. The plurality of leg frames constituting the second holding portion 2220 may rotatably receive a second pin 2840, which will be described below.

The knob unit 2400 may be connected to the holding bracket 2200. The knob unit 2400 may be disposed in the glove box 1000 such that the knob unit 2400 is exposed when the glove box 1000 is in an open state and is not exposed when the glove box 1000 is in a closed state. The knob unit 2400 may include the knob main body 2410, a pressing portion 2420, the first pin 2430, and the first elastic member 2440.

The knob main body 2410 may be disposed in the first holding portion 2210 of the holding bracket 2200 and the first receiving portion 1230 of the glove box 1000. The knob main body 2410 may be a portion that is operated by a user. When the glove box 1000 is rotated for the storage block 1210 to be exposed, the knob main body 2410 may be exposed to be visible to the passenger seated in the passenger compartment. The knob main body 2410 may be provided with a concave-convex portion 2412.

The concave-convex portion 2412 is a portion that comes into contact with the passenger's hand to operate the knob main body 2410, and may be formed by a convex portion and a concave portion being successively and alternately disposed. The concave-convex portion 2412 may be a configuration that increases a frictional force to prevent the passenger's hand operating the knob main body 2410 from slipping away from the knob main body 2410.

The pressing portion 2420 may be connected to the knob main body 2410. The pressing portion 2420 is a portion of the knob unit 2400 that is not exposed when the glove box 1000 is rotated for the storage block 1210 to be exposed, and may be disposed in a space between the plurality of leg frames constituting the second holding portion 2220 of the holding bracket 2200. Therefore, the pressing portion 2420 may be in contact with a first contact portion 2810 of the rotator 2800, which will be described below. The pressing portion 2420 may press the first contact portion 2810 of the rotator 2800 while rotating along the knob main body 2410 when the knob main body 2410 is rotated.

The knob main body 2410 and the pressing portion 2420 may be integrally formed. This is because the conventional knob main body 2410 was exposed to be visible to the passenger, so a component that is operated by the passenger needed to be provided separately to improve a sense of design. However, since the knob main body 2410 is not exposed in the closed state of the glove box 1000, in the present invention, the need to separately provide a component that is pressed by the passenger is eliminated for improving the sense of design. Therefore, the manufacturing cost and manufacturing time of the glove box assembly 1 may be reduced.

The first pin 2430 may be disposed in the knob main body 2410. The first pin 2430 may be provided in a cylindrical shape. The first pin 2430 may be rotatably coupled to the first holding portion 2210 of the holding bracket 2200 while coupled to the knob main body 2410. The first pin 2430 may be a center of rotation of the knob main body 2410 and the pressing portion 2420. Therefore, when the knob main body 2410 is pressed by the passenger, the knob main body 2410 and the pressing portion 2420 may be rotated about the first pin 2430.

The first elastic member 2440 may be coupled to the first pin 2430. The first elastic member 2440 may be a torsion spring that is configured with a winding portion that is wound to enclose an outer surface of the first pin 2430 and a support portion that is disposed in a straight line from an end portion of the winding portion and comes into contact with the knob main body 2410. When the knob main body 2410 is pressed to open the storage block 1210, the first elastic member 2440 may be rotated with the knob main body 2410. In addition, when the pressed state of the knob main body 2410 is released, the first elastic member 2440 may elastically return to allow the knob main body 2410 and the pressing portion 2420 to return to a position in which the knob main body 2410 was disposed before being pressed.

The rod unit 2600 passes through the glove box 1000 and is coupled to the cockpit module, and may fix or release the glove box 1000 to or from the cockpit module in conjunction with movement of the knob unit 2400. The rod unit 2600 may include the first rod 2610, the second rod 2620, a support block 2630, and a gear 2640.

The first rod 2610 may be disposed in a position facing the holding bracket 2200 and the knob unit 2400. The first rod 2610 may be engaged with the gear 2640. The first rod 2610, while engaged with the gear 2640, may be movably disposed in a lower area of the gear 2640 with respect to the gear 2640. The end portion of the first rod 2610 may be movably disposed in the support hole 1212 of the storage block 1210 of the glove box 1000. The end portion of the first rod 2610 may be movably disposed in the cockpit module while protruding to the outside of the storage block 1210 through the support hole 1212. The first rod 2610 may include a third protrusion 2612 and a stopper portion 2614.

The third protrusion 2612 may protrude along a height direction from an area of the first rod 2610 that faces the rotator 2800. The third protrusion 2612 may be in contact with a second contact portion 2820 of the rotator 2800, which will be described below. The third protrusion 2612 may be moved in a direction toward the gear 2640 by the second contact portion 2820 of the rotator 2800, or in an opposite direction. In this case, a separate elastic member may be installed on the first rod 2610, and the separate elastic member may assist in the return movement of the first rod 2610, which is moved in a direction opposite to the direction facing the gear 2640.

The stopper portion 2614 may be connected to the third protrusion 2612 to form one closed loop on the first rod 2610. The stopper portion 2614 may be disposed in a position that overlaps the first contact portion 2810 of the rotator 2800, which will be described below. The stopper portion 2614 may be in contact with a first rotating portion 2830 of the rotator 2800, which is rotated by the pressing portion 2420, to stop the rotation of the first rotating portion 2830.

The second rod 2620 may be disposed in a position not facing the holding bracket 2200 and the knob unit 2400. The second rod 2620 may be engaged with the gear 2640. The second rod 2620 may be disposed to be spaced apart from the first rod 2610 with the gear 2640 interposed therebetween. The second rod 2620, while engaged with the gear 2640, may be movably disposed in an upper area of the gear 2640 with respect to the gear 2640. The end portion of the second rod 2620 may be movably disposed in the support hole 1212 of the storage block 1210 of the glove box 1000. The end portion of the second rod 2620 may be movably disposed in the cockpit module while protruding to the outside of the storage block 1210 through the support hole 1212.

The support block 2630 may rotatably support the gear 2640. The support block 2630 may be disposed at a position where the end portion of the first rod 2610 overlaps the end portion of the second rod 2620.

The gear 2640 may be rotatably coupled to the support block 2630. The gear 2640 may be rotated in place while coupled to the support block 2630. The gear 2640 may be engaged with the first rod 2610 and the second rod 2620.

The rotator 2800 may be disposed in different directions to connect the knob unit 2400 and the rod unit 2600. The rotator 2800 may include a first contact portion 2810 and a second contact portion 2820 that receive a rotational force generated by the knob unit 2400 to move the rod unit 2600. In addition, the rotator 2800 may include the rotating portion 2830, the second pin 2840, and a second elastic member 2850.

The first contact portion 2810 may be disposed in the space between the plurality of leg frames of the second holding portion 2220 of the holding bracket 2200. The first contact portion 2810 may be in contact with the first pressing portion 2420 of the knob unit 2400. When the first pressing portion 2420 of the knob unit 2400 is rotated, the first contact portion 2810 may be rotated by a pressing force formed by the first pressing portion 2420.

The second contact portion 2820 may come into contact with the third protrusion 2612 of the first rod 2610. The second contact portion 2820 may be connected to the first contact portion 2810. When the first contact portion 2810 is rotated, the second contact portion 2820 may be rotated with the first contact portion 2810 to press the third protrusion 2612 of the first rod 2610.

The rotating portion 2830 may be coupled to the first contact portion 2810 and the second contact portion 2820. The rotating portion 2830 may support the first contact portion 2810 and the second contact portion 2820. The rotating portion 2830 may be disposed in a space between the first protrusion 2222 and the second protrusion 2224 of the holding bracket 2200. The rotating portion 2830 may not be deviated from the space between the first protrusion 2222 and the second protrusion 2224 through the second pin 2840.

The second pin 2840 may be coupled to the rotating portion 2830. The second pin 2840 may be rotatably coupled to the first protrusion 2222 and the second protrusion 2224 of the holding bracket 2200 while coupled to the rotating portion 2830. Thus, the second pin 2840 may be disposed along the height direction. The second pin 2840 may be a center of rotation of the first contact portion 2810, the second contact portion 2820, and the rotating portion 2830.

The second elastic member 2850 may be coupled to the second pin 2840. The second elastic member 2850 may be a torsion spring that is configured with a winding portion that is wound to enclose an outer surface of the second pin 2840 and a support portion that is disposed in a straight line from one area of the winding portion and comes into contact with the knob main body 2410. The second elastic member 2850 may be rotated with the second pin 2840 when the first contact portion 2810 is pressed by the pressing portion 2420 of the knob unit 2400. In addition, when the pressed state of the knob main body 2410 is released, the second elastic member 2850 may elastically return to allow the first contact portion 2810, the second contact portion 2820, and the rotating portion 2830 to return to a position in which the first contact portion 2810 was disposed before being pressed.

As described above, the first contact portion 2810 and the second contact portion 2820 of the rotator 2800 may be rotated in the same direction with respect to one center. More specifically, the first contact portion 2810 and the second contact portion 2820 may be connected to each other so that the first contact portion 2810 and the second contact portion 2820 may be rotated in the same direction with respect to the second pin 2840 as the center of rotation. That is, the first contact portion 2810 and the second contact portion 2820, which are disposed in different directions, may take an integrated movement in response to the operation of the passenger while the knob unit 2400 and the rod unit 2600 are connected, thereby eliminating the need for additional components to enable the knob unit 2400 and the rod unit 2600 to move at the same time, which may reduce the manufacturing cost and manufacturing time of the glove box assembly 1.

With reference to FIG. 6, the first contact portion 2810 of the rotator 2800 may be disposed above the second contact portion 2820 along an axial direction of the rotating portion 2830. More specifically, the first contact portion 2810 may be disposed above the second contact portion 2820 along the axial direction of the second pin 2840. Therefore, the first contact portion 2810, which is pressed and rotated by the pressing portion 2420 of the knob unit 2400, may be disposed in a position overlapping the stopper portion 2614 by a height difference with the second contact portion 2820, and the movement of the first contact portion 2810 may be stopped by coming into contact with the stopper portion 2614. That is, even if the first contact portion 2810 is over-rotated by the pressing force generated by the knob unit 2400, the movement of the first contact portion 2810 is stopped by the stopper portion 2614, so that the possibility of failure of the knob unit 2400 can be reduced, thereby maintaining the lifespan of the knob unit 2400.

With reference to FIG. 7, the second pin 2840 may be disposed closer to the first pin 2430 than the concave-convex portion 2412 of the knob main body 2410. Therefore, the opening and closing apparatus 2000 can be slimmed down, and more storage space of the storage block 1210 can be secured than in the conventional glove box 1000, thereby improving the convenience of storage.

In addition, the knob main body 2410 of the knob unit 2400 is disposed to be spaced apart from the rotator 2800 with the plurality of leg frames forming the second holding portion 2220 of the holding bracket 2200 interposed therebetween, and the pressing portion 2420 of the knob unit 2400 may be in contact with the rotator 2800 in the space between the plurality of leg frames of the holding bracket 2200. This may mean that the rotation area of the rotator 2800, which is rotated by the pressing portion 2420 of the knob unit 2400, may be disposed adjacent to the holding bracket 2200, thereby achieving a reduction in an overall thickness of the opening and closing apparatus 2000. Therefore, the opening and closing apparatus 2000 can be slimmed down, and more storage space of the storage block 1210 can be secured than in the conventional glove box 1000, thereby improving the convenience of storage.

Hereinafter, a process of opening the storage block 1210 of the glove box 1000 is described.

Figure 8:
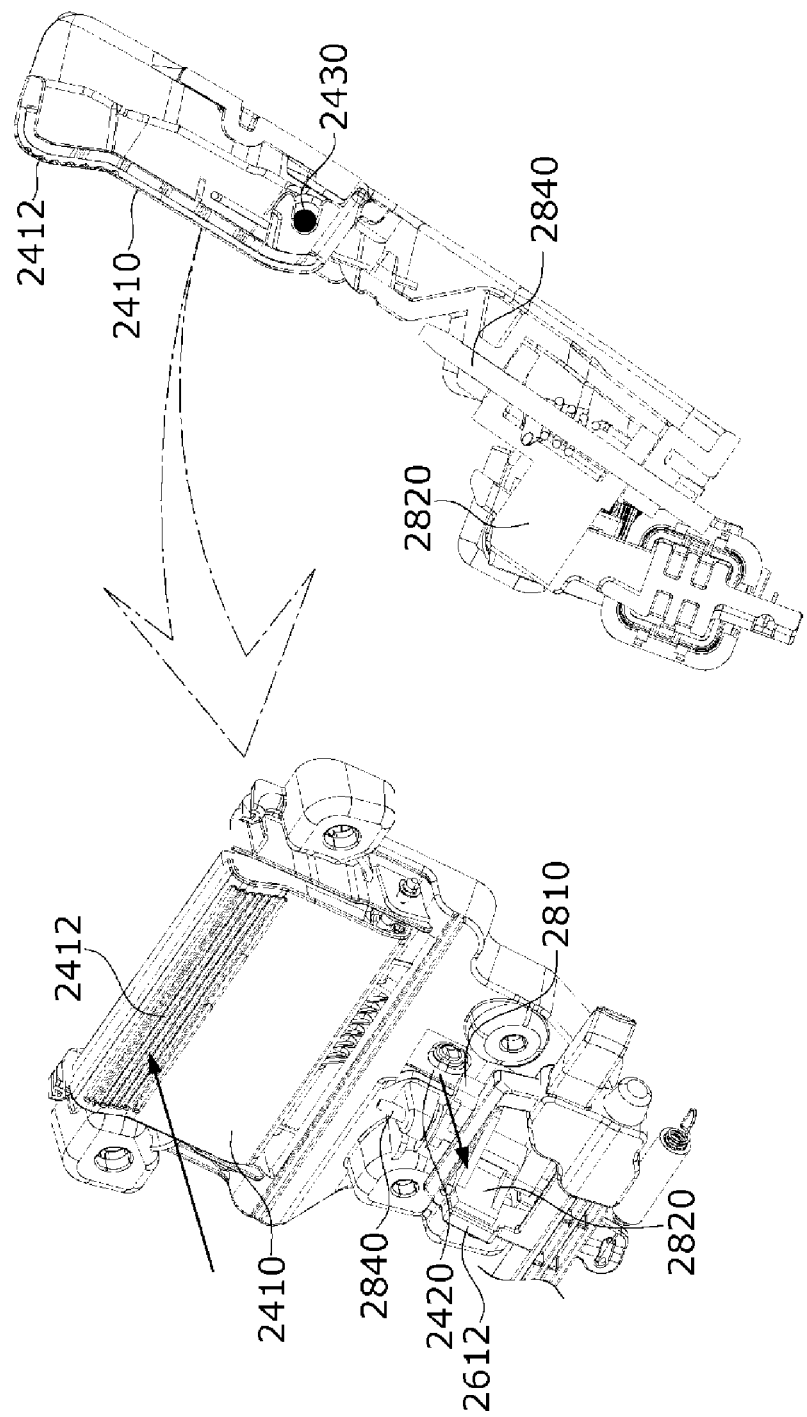
FIG. 8 is a view illustrating a state of a first rod coupled to the rotator.
Figure 9:
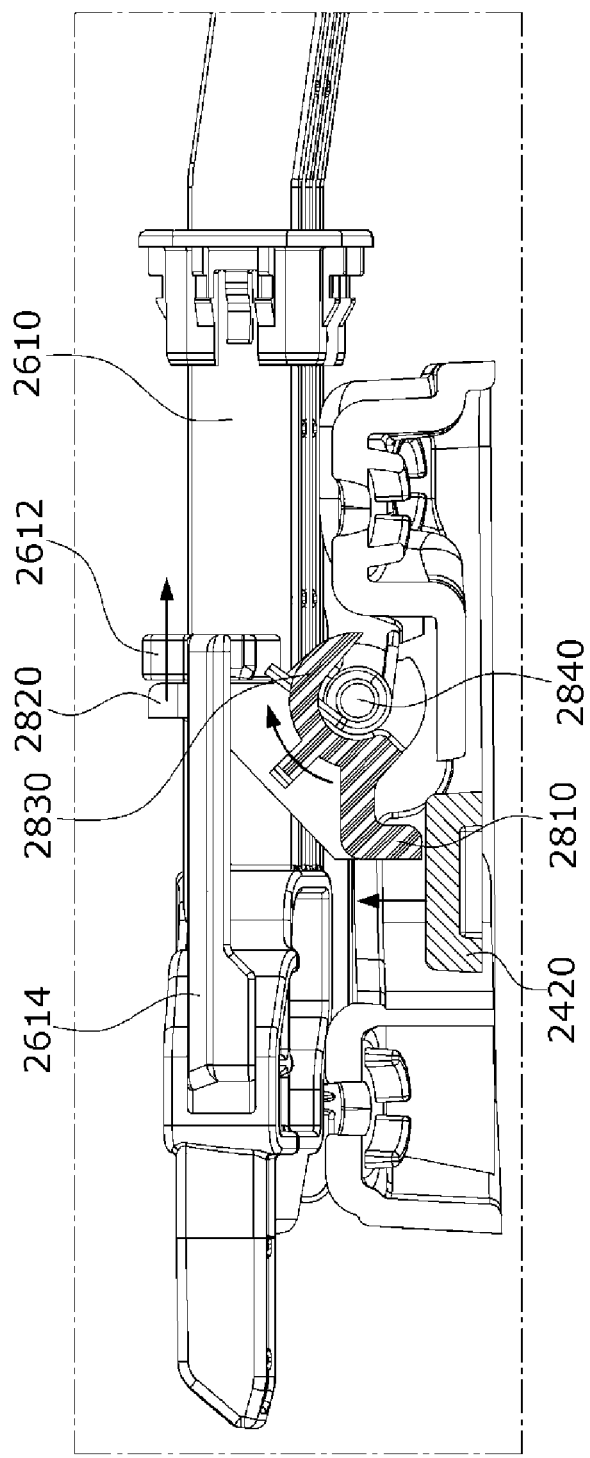
FIG. 9 is a view illustrating the coupling relationship of the knob unit, the rotator, and the first rod.

FIG. 8 is a view illustrating a state of the first rod coupled to the rotator, and FIG. 9 is a view illustrating the coupling relationship of the knob unit, the rotator, and the first rod.

With reference to FIGS. 1 to 9, and more specifically with reference to FIGS. 8 and 9, in a state where the glove box assembly 1 is not operated by the passenger (a default state), the end portion of the first rod 2610 and the end portion of the second rod 2620 pass through the support hole 1212 of the storage block 1210 and are coupled to the cockpit module. Accordingly, the storage block 1210 maintains a closed state so that the storage block 1210 is not visible to the passenger.

In this state, when the passenger presses the concave-convex portion 2412 of the knob main body 2410, the concave-convex portion 2412 is pressed toward the cover panel 1400. When the concave-convex portion 2412 is pressed, the knob main body 2410 and the pressing portion 2420 are rotated with the first pin 2430 about the center of the first pin 2430.

When the pressing portion 2420 of the knob unit 2400 is rotated along the first pin 2430, the pressing portion 2420 presses the first contact portion 2810 of the rotator 2800. In this state, when the pressing portion 2420 keeps being rotated with the first pin 2430, the first contact portion 2810 of the rotator 2800, which receives the pressing force through the pressing portion 2420, is rotated with the second pin 2840 about the center of the second pin 2840. When the first contact portion 2810 is rotated, the second contact portion 2820 and the rotating portion 2830 are rotated together with the first contact portion 2810. Accordingly, the second contact portion 2820, which is in contact with the third protrusion 2612 of the first rod 2610, presses the third protrusion 2612.

In this state, when the rotator 2800 keeps being rotated by the rotation of the knob unit 2400, the third protrusion 2612 of the first rod 2610 is moved toward the gear 2640 of the rod unit 2600 by the pressing force generated through the second contact portion 2820 of the rotator 2800. When the first rod 2610 is moved, the gear 2640 is rotated in place, and the second rod 2620 is also moved toward the gear 2640. In this process, the end portion of the first rod 2610 that is coupled to the cockpit module and the end portion of the second rod 2620 are released from coupling, thereby causing the glove box 1000 to be rotated. Accordingly, the storage block 1210 may finally be opened.

As described above, the glove box assembly 1 according to one embodiment of the present invention requires fewer components to open the storage block 1210 compared to the conventional glove box assembly, thereby reducing the manufacturing cost and manufacturing time.

Further, the glove box assembly 1 according to one embodiment of the present invention may facilitate the operation of the knob unit 2400 with less force, thereby improving the convenience of opening and closing the glove box 1000.

According to one embodiment of the present invention, a glove box can be easily opened with less force, thereby improving the convenience of operation and usability of the glove box.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An opening and closing apparatus, the opening and closing apparatus comprising:
   a knob unit disposed on a glove box provided in a cockpit module, the knob unit being configured to be exposed when the glove box is in an open state and not exposed when the glove box is in a closed state;
   a rod unit coupled to the cockpit module through the glove box, the rod unit being configured to fix or release the glove box to or from the cockpit module in conjunction with a movement of the knob unit; and
   a rotator including a first contact portion and a second contact portion disposed in different directions to connect the knob unit and the rod unit, the rotator being configured to move the rod unit by receiving a rotational force generated through the knob unit,
   wherein the rotator comprises:
   a rotating portion configured to support the first contact portion and the second contact portion; and
   a second pin coupled to the rotating portion, the second pin being configured to provide a center of rotation about which the first contact portion, the second contact portion, and the rotating portion are configured to be rotated.

2. The opening and closing apparatus of claim 1, wherein the first contact portion and the second contact portion are configured to be rotated in a same direction with respect to one center.

3. The opening and closing apparatus of claim 1,
   wherein the first contact portion is disposed above the second contact portion along an axial direction of the rotating portion.

4. The opening and closing apparatus of claim 3, wherein the knob unit comprises:
   a knob main body including a concave-convex portion;
   a pressing portion disposed on the knob main body and in contact with the first contact portion; and
   a first pin configured to connect a box main body of the glove box to the knob main body,
   wherein the second pin is disposed closer to the first pin than the concave-convex portion of the knob main body.

5. The opening and closing apparatus of claim 4, wherein the knob main body and the pressing portion are integrally formed.

6. The opening and closing apparatus of claim 1, wherein the glove box is rotatably disposed in a cockpit module to open and close the glove box.

7. A glove box assembly, comprising:
   a glove box rotatably disposed in a cockpit module; and
   an opening and closing apparatus for the glove box coupled to the glove box and configured to open and close the glove box,
   wherein the opening and closing apparatus for the glove box comprises:
   a knob unit disposed on the glove box, the knob unit being configured to be exposed when the glove box is in an open state and not exposed when the glove box is in a closed state;
   a rod unit coupled to the cockpit module through the glove box, the rod unit being configured to fix or release the glove box to or from the cockpit module in conjunction with movement of the knob unit; and
   a rotator including a first contact portion and a second contact portion disposed in different directions to connect the knob unit and the rod unit, the rotator being configured to move the rod unit by receiving a rotational force generated through the knob unit,
   wherein the rotator comprises:
   a rotating portion configured to support the first contact portion and the second contact portion; and
   a second pin coupled to the rotating portion, the second pin being configured to provide a center of rotation about which the first contact portion, the second contact portion, and the rotating portion are configured to be rotated.

8. The glove box assembly of claim 7, wherein the first contact portion and the second contact portion of the rotator are configured to be rotated in a same direction with respect to one center.

9. The glove box assembly of claim 7,
   wherein the first contact portion is disposed above the second contact portion along an axial direction of the rotating portion.

10. The glove box assembly of claim 9, wherein the knob unit comprises:
    a knob main body including a concave-convex portion;
    a pressing portion disposed on the knob main body and in contact with the first contact portion; and
    a first pin configured to connect a box main body of the glove box to the knob main body, wherein the second pin is disposed closer to the first pin than the concave-convex portion of the knob main body.

11. The glove box assembly of claim 10, wherein the opening and closing apparatus comprises a holding bracket comprising:
   a first holding portion configured to rotatably receive the first pin; and
   a second holding portion comprising leg frames configured to rotatably receive the second pin,
   wherein the knob main body of the knob unit is spaced apart from the rotator with the second holding portion of the holding bracket interposed therebetween, and
   wherein the pressing portion of the knob unit is configured to be in contact with the rotator in a space between the leg frames.

* * * * *